340-870.12 SR
XR 2,910,682
ROSS REFERENCE
SEARCH ROO

Oct. 27, 1959 E. LEONARD 2,910,682

SWITCHING CIRCUIT

Filed July 29, 1954

INVENTOR.
EUGENE LEONARD
BY S.C. Yuter
ATTORNEY.

2910682
340/345

United States Patent Office 2,910,682

Patented Oct. 27, 1959

2,910,682

SWITCHING CIRCUIT

Eugene Leonard, Elmhurst, N.Y., assignor to Underwood Corporation, New York, N.Y., a corporation of Delaware Application July 29, 1954, Serial No. 446,539

3 Claims. (Cl. 340—345)

This invention relates to information processing apparatus, and more particularly to circuits for switching signals which represent information.

Information may be represented by the amplitude of a signal. For example, a three-volt signal may represent the number three and a one-volt signal may represent the number one. Information may also be represented by the presence or absence of signals rather than by the amplitude of each individual signal. For example, the presence of three sequential signals may represent the number seven.

The first method of representation is generally called analogue since the information is represented by an analogue, namely, the electrical quality of a signal. The second method of representation is termed digital.

In information processing apparatus a primary requirement is the ability to switch information signals. Heretofore circuits which respond to the amplitudes of input signals to perform a switching operation have generally been considered satisfactory. However, where the signals representing the information are of relatively low amplitudes many of these amplitude-responsive switching circuits are too insensitive to be useful.

In processing digital information signals of low-order-magnitude switching circuits are required whose abilities to switch are not determined by the amplitudes of the signals being processed. In switching analogue information singals of low-order magnitude, circuits are required which additionally can pass output signals whose amplitudes relate to those of the analogue signals.

An object of the invention, therefore, is to provide an improved switching circuit.

Another object of the invention is to provide a switching circuit for switching information signals of relatively low amplitude.

A further object of the invention is to provide improved switching circuits for information processing equipment which utilizes analogue representations.

A still further object of the invention is to provide apparatus for switching digitally represented information of low-order amplitude.

Briefly a switching circuit in accordance with the invention comprises a controllable source of a gating signal of one frequency, and means for receiving an information signal which is of a different frequency. The information and gating signals are mixed together and a frequency-selective circuit is provided to pass one of the components of the signal produced by the mixing. This component represents the same information as the information signal.

An advantage of the invention is that the switching circuit may be employed in equipment which utilizes both analogue and digital information representations.

Another advantage of the invention is that switching circuits are provided which are not only responsive to information signals of relatively low-order amplitude but are also responsive to relatively high-amplitude signals.

The invention will be more readily understood from the following description taken together with the accompanying drawings in which.

Figure 1:
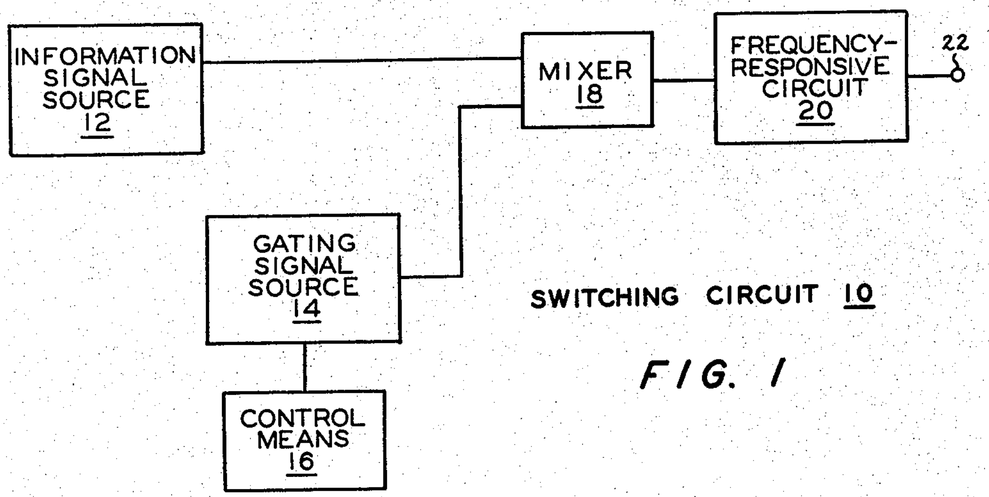
Fig. 1 is a block diagram of a switching circuit in accordance with the invention.

Referring now to the switching circuit 10 of Fig. 1, the apparatus comprises an information signal source 12, a gating signal source 14, control means 16, a mixer 18 and a frequency-responsive circuit 20.

The mixer 18 receives input signals both from the gating signal source 14 (as controlled by the control means 16) and from the information signal source 12. The frequency-responsive circuit 20 couples the mixer 18 to an output terminal 22.

The information signal source 12 is a source of a constant frequency signal. The frequency may be, for example, four megacycles. The amplitude of the signal produced by information signal source 12 may be constant (for digital information) or variable (for analogue information). If digital information is being handled, the signal is present or absent. An example of a variable-amplitude signal and its source is the signal produced by well-known strain gage apparatus in which an oscillator feeds through a bridge having one branch whose impedance varies with strain.

The gating signal source 14 is an oscillator and may be, for example, a Hartley oscillator as illustrated in Radio Engineers' Handbook, page 480, section 6 (Oscillators); first edition, eighth impression; by F. E. Terman; McGraw-Hill Book Company, Inc., New York.

The gating signal source 14 generates a constant frequency signal which may be, for example, a five megacycle signal. The amplitude of this signal is normally constant, but there are applications in which a variable-amplitude gating signal is desired as will hereinafter be noted.

The gating signal is fed to the mixer 18 as controlled by control means 16. Control means 16, if desirable, may be an integral part of either the gating signal source 14 or mixer 18. It is essential that the mixing is controlled. Control means 16 may be, for example, a flip flop which biases a vacuum tube of the Hartley oscillator so that the tube does not conduct.

The mixer 18 is preferably a conventional balanced modulator such as illustrated in Fig. 22(*a*) of par. 7, page 551 of Radio Engineers' Handbook as cited above. The "carrier" of the reference is supplied by the gating signal source 14 which is controlled by control means 16 and the information signal source 12 supplies the "modulating" voltage as described in the reference.

When the information signal is to be sampled, the gating signal is passed to the mixer 18 by control means 16 and is mixed with the information signal in a well-known manner. The resulting signal produced by the mixer 18 contains two components whose frequencies are respectively the sum and difference of the frequencies of the information and gating signals. Because of the use of a balanced modulator, the gating signal is cancelled and does not appear in the output signal of mixer 18.

The frequency-responsive circuit 20 may be one of the well-known types of filters and is designed to pass through either the sum or difference frequency component received from mixer 18. The filter should also accommodate the band of frequencies necessary to pass the information. It should be noted that if the frequency-responsive circuit 20 is sufficiently selective, the gating signal can be blocked at the frequency-responsive circuit 20 so that the necessity of using a balanced modulator as mixer 18 is obviated.

Using the example frequencies, the five megacycle gating signal is controllably mixed with the four megacycle information signal. The resulting signal contains one and nine megacycle components. In a preferred embodiment, the one megacycle signal is passed by the frequency-responsive circuit 20 to the output terminal 22.

If control means 16 prevents the gating signal from being fed to the mixer 18, there is no mixing. The information signal is thus fed to the frequency-responsive circuit 20 and is blocked so that no output signal appears at output terminal 22. Thus, only when the gating signal is passed to mixer 18 can an output signal result.

It should be noted that switching circuit 10 does not respond to the amplitudes of either the gating or information signal to perform its gating operation and that the information signal is sampled by controllable application of the gating signal to the mixer 18.

If, however, intelligence is conveyed by the amplitude of the information signal, the amplitude of the output signal varies proportionately to the amplitude of the information signal in a well-known modulating manner. The gating signal may also convey intelligence by its amplitude since the amplitude of the output signal will vary proportionately to the product of the amplitudes of the information and gating signals.

Since amplitude is not relied upon to control the switching function, the switching circuit 10 is as well-suited for operation with information signals in the millivolts range as in higher voltage ranges. For example, the switching circuit 10 can conveniently function with information signals whose amplitudes are less than ten millivolts.

Figure 2:
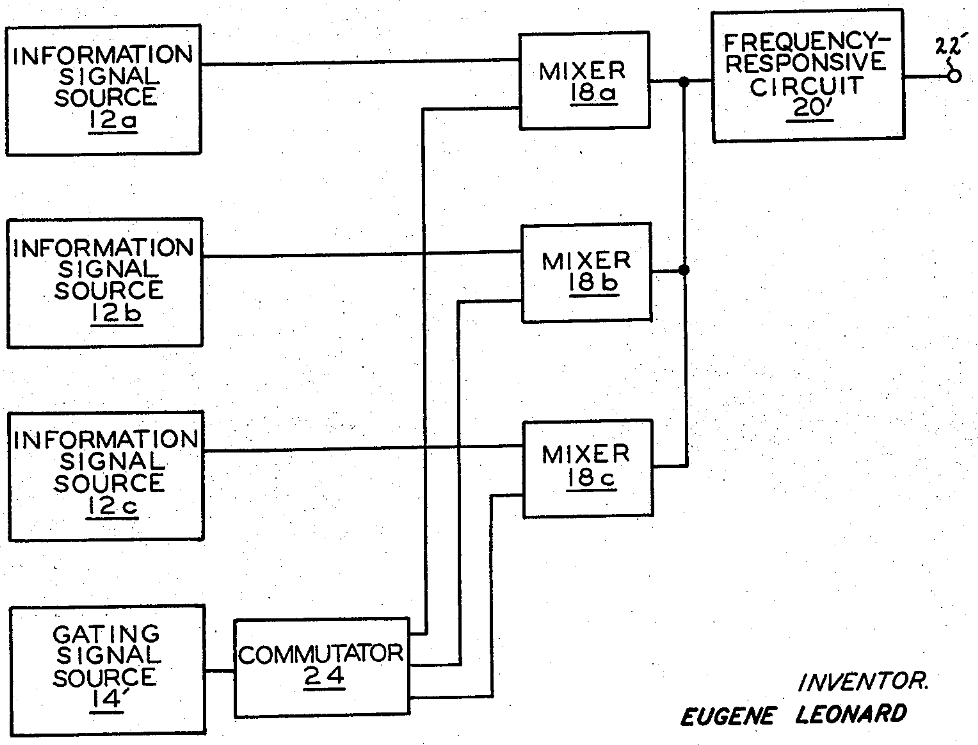
Fig. 2 is a block diagram of a circuit which embodies switching circuits in accordance with the invention.

A circuit is shown in Fig. 2 which embodies switching circuits in accordance with the invention. The circuit comprises information signal sources 12*a–c*, gating signal source 14′, commutator 24, mixers 18*a–c*, and frequency-responsive circuit 20′.

Information signal sources 12*a–c* are coupled to the mixers 18*a–c* respectively. The gating signal source 14′ is selectively coupled by the commutator 24 to each of the mixers 18*a–c*. The commutator 24 may be a radial beam tube, or any device which will controllably couple the gating signal source 14′ sequentially to each of the mixers 18*a–c*. The frequency-responsive circuit 20′ couples each mixer 18 to the output terminal 22′.

In operation, the signals available at the information signal sources 12*a–c* are transmitted simultaneously to the mixers 18*a–c*. The gating signal of the gating signal source 14′ is transmitted to the commutator 24 which sequentially transmits or distributes the gating signal to mixers 18*a–c*.

As the gating signal is transmitted to a particular one of the mixers 18*a–c*, an output signal is generated having components whose frequencies are the sum and difference of the frequencies of the information and gating signals.

The frequency-responsive circuit 20′ is tuned to pass one of the components of the output signal of the mixers 18.

In a preferred embodiment of the invention the frequency-responsive circuit 20′ passes the component whose frequency is the difference between the frequencies of the information and gating signals.

It therefore follows that only the mixer 18 which receives the gating signal from the commutator 24 is the mixer which produces a component which will be passed by the frequency-responsive circuit 20′. Therefore only the intelligence which is contained in one information signal at a time will be conveyed to the output terminal 22′.

Thus, in accordance with the invention, a switching circuit has been shown which does not rely upon the amplitude of received signals to perform a switching operation. Further, although the switching circuit does not depend upon the amplitude of switching signals to perform the switching operation, the switching circuit is capable of passing output signals whose amplitudes relate to the amplitudes of the input signals.

There will now be obvious to those skilled in the art many modifications and variations utilizing the principles set forth and realizing many or all of the objects and advantages of the circuits described but which do not depart essentially from the spirit of the invention.

What is claimed is:

1. A switching circuit comprising a plurality of information signal sources each producing an information signal of a first frequency, a plurality of mixers each being coupled to one of said plurality of information signal sources, a gating signal source for producing a gating signal of a second frequency, a commutator for sequentially coupling said gating signal source to each of said plurality of mixers for producing information modulated signals of a third frequency and a filter coupled to said plurality of mixers for producing information modu- third frequency.

2. A switching circuit for connecting each of a plurality of input information signals to an output circuit comprising a plurality of information sources, each source providing a modulated signal of a first frequency, a source of gating signals of a second frequency, a distributing means having an input coupled to said source of gating signals and a plurality of output leads, said distributing means being operative to sequentially apply said gating signal to said output leads, a plurality of modulating devices, each receiving a signal from one of said information sources and one of said ouput leads and generating from said two signals a modulated signal of a third frequency, a device to transmit only signals of said third frequency, and means connecting the outputs of all said modulating devices to the input of said transmitting device.

3. An information transmission circuit comprising a plurality of sources of modulated information signals of a first frequency, a source of continuous signals of a second frequency, a commutator having a plurality of output leads and operating to pass said second frequency signals from said continuous signal source to said output leads in sequence, a plurality of mixer circuits each having two inputs and an output connection, means to connect one of said information sources and one of said commutator output leads to the inputs of each said mixer circuits, a filter circuit to transmit only signals of said third frequency, and means connecting the outputs of all said mixer circuits to said filter circuit.

References Cited in the file of this patent

UNITED STATES PATENTS

| | | |
|---|---|---|
| 1,849,827 | Fitzgerald | Mar. 15, 1932 |
| 2,039,405 | Green | May 5, 1936 |
| 2,092,442 | Colwell | Sept. 7, 1937 |
| 2,482,112 | Johnson | Sept. 30, 1949 |
| 2,485,886 | Johnstone et al. | Oct. 25, 1949 |
| 2,850,725 | Beaumont | Sept. 2, 1958 |

FOREIGN PATENTS

| | | |
|---|---|---|
| 128,537 | Australia | July 28, 1948 |

OTHER REFERENCES

Radio Engineers' Handbook; Terman, F. E.; first edition, 2nd impression; McGraw-Hill Book Co. Inc., 1943, pp. 551–553.